July 11, 1967  R. W. SELLECK  3,330,045
ELEVATION MEASURING INSTRUMENT
Filed Oct. 21, 1963  6 Sheets-Sheet 4
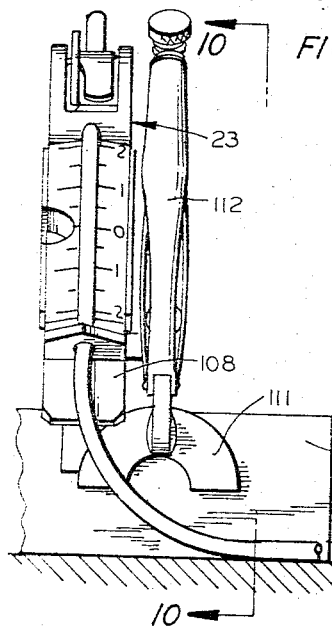
FIG_9
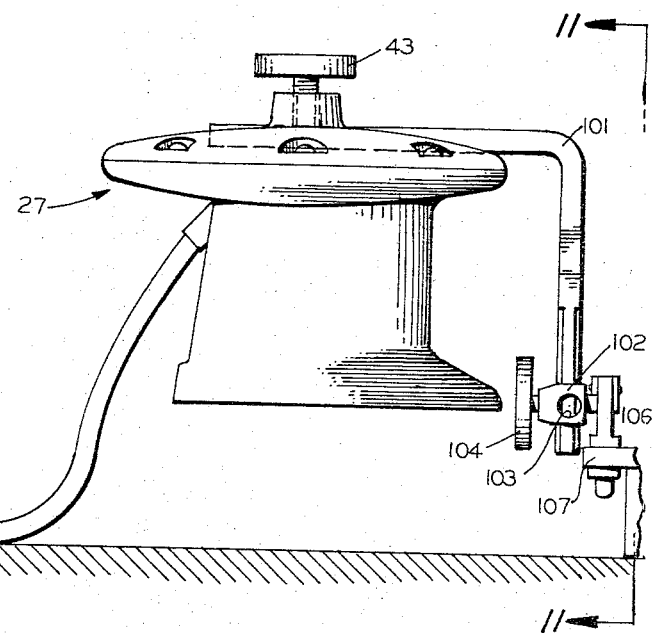
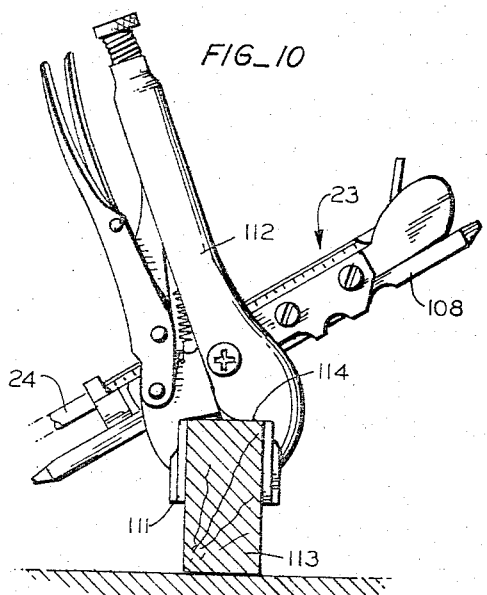
FIG_10
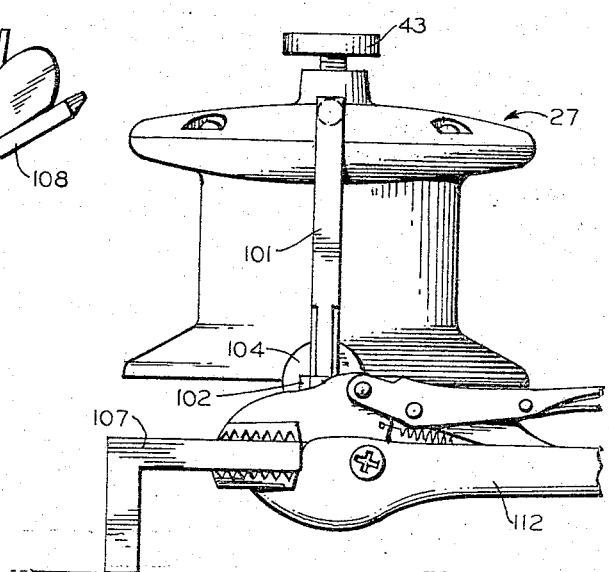
FIG_11
INVENTOR.
ROBERT W. SELLECK
BY
Allen and Chromy
ATTORNEYS

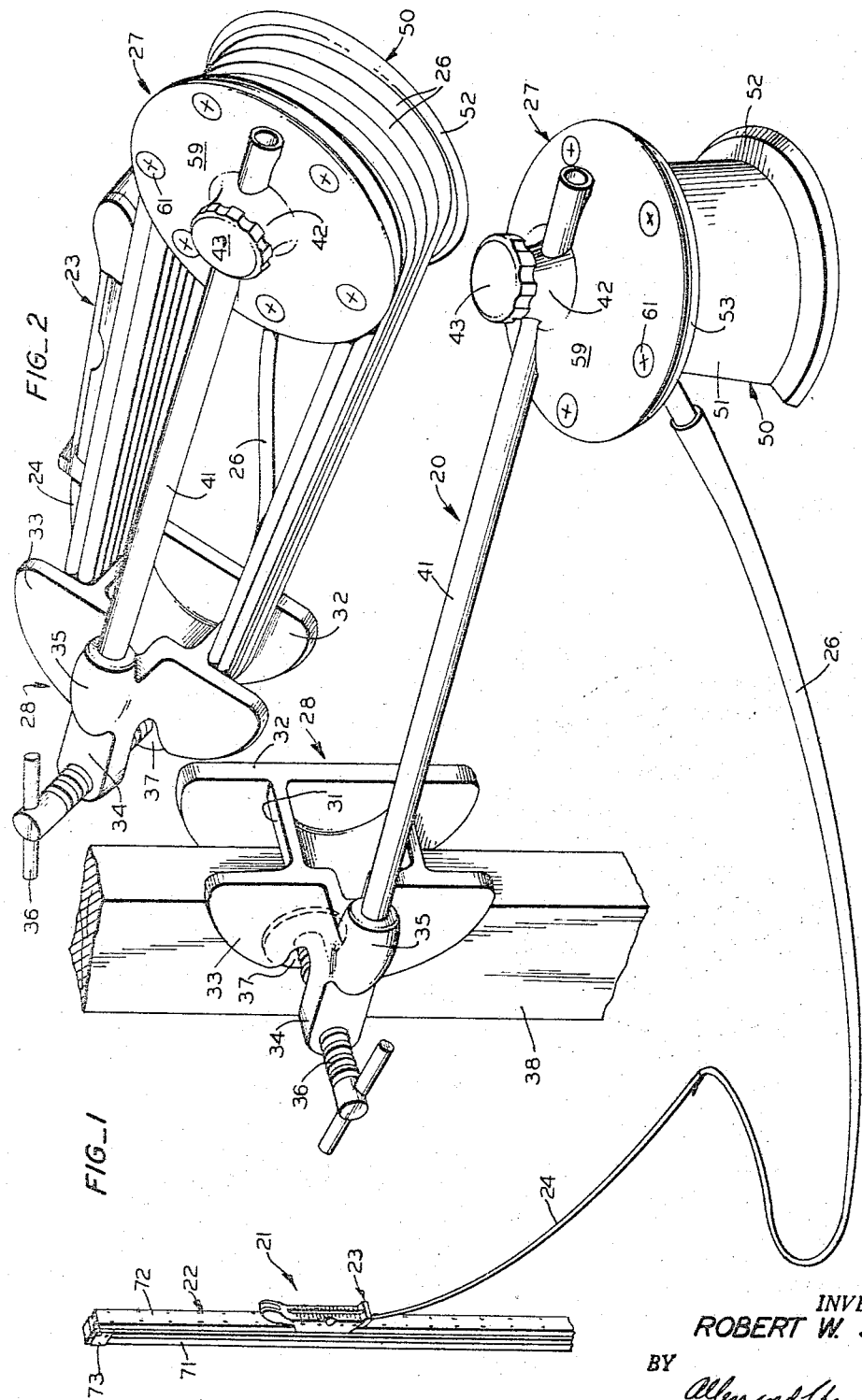

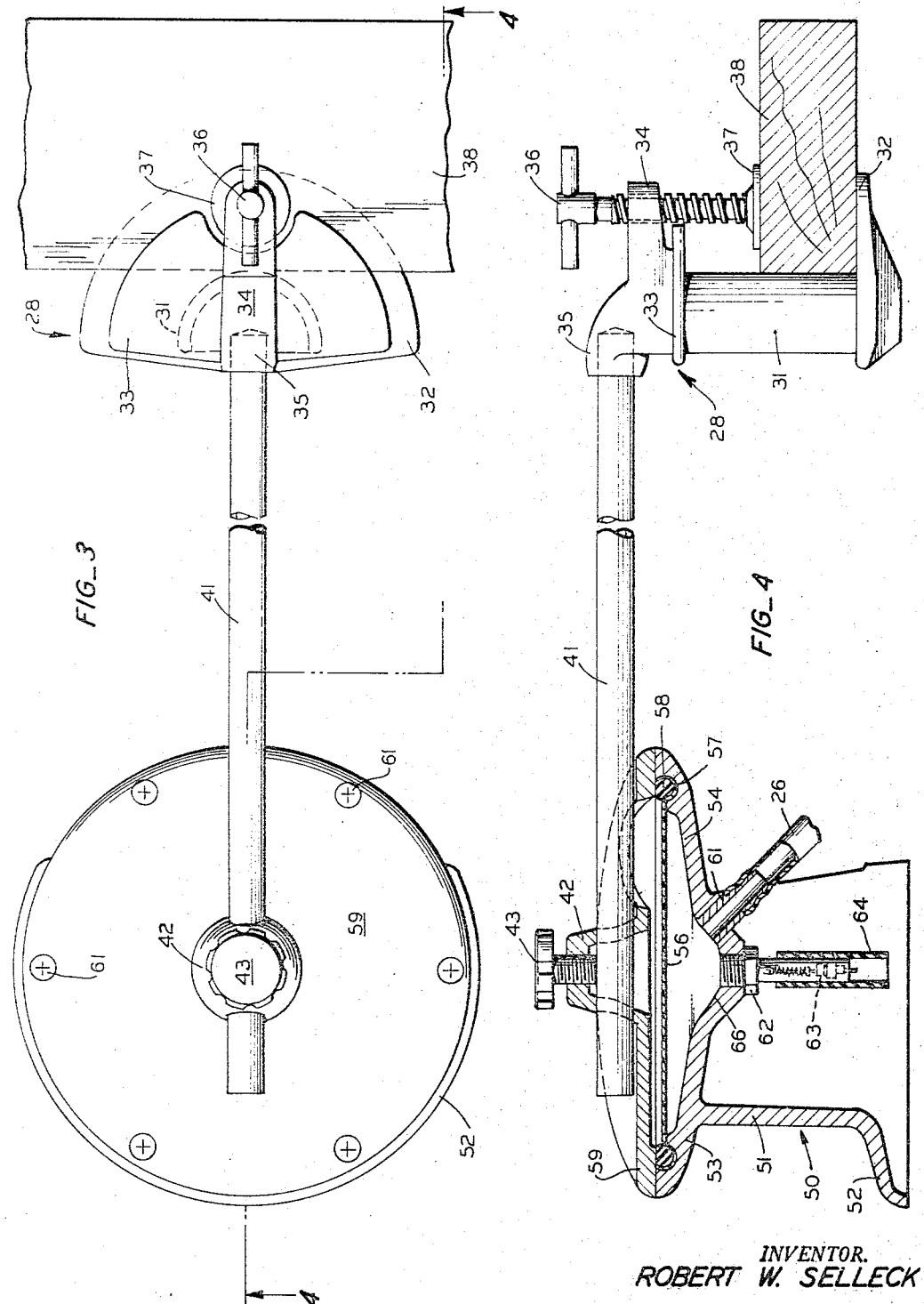

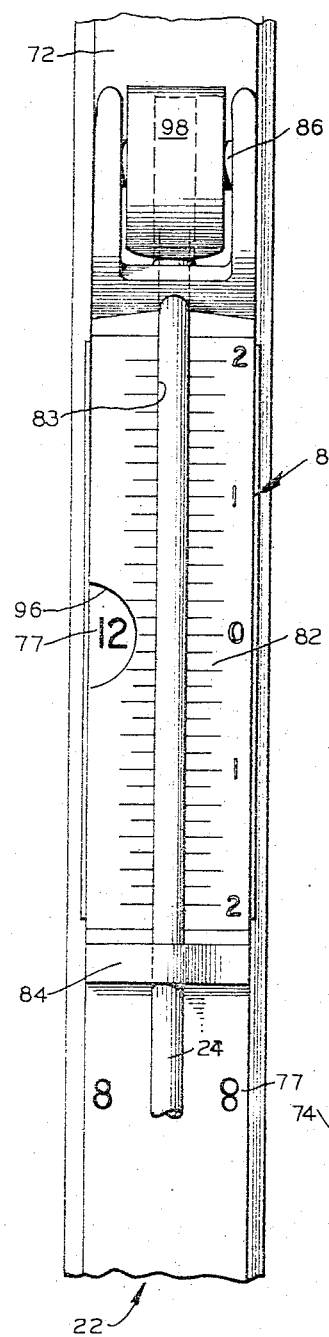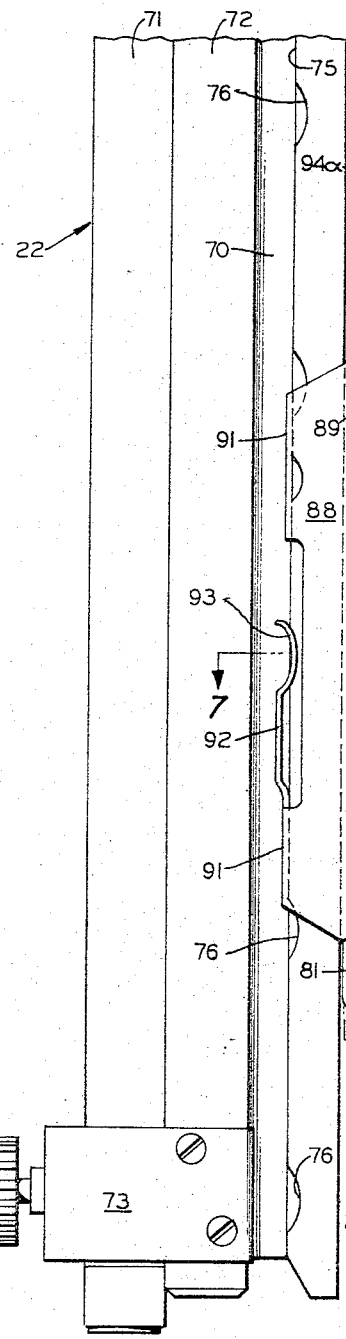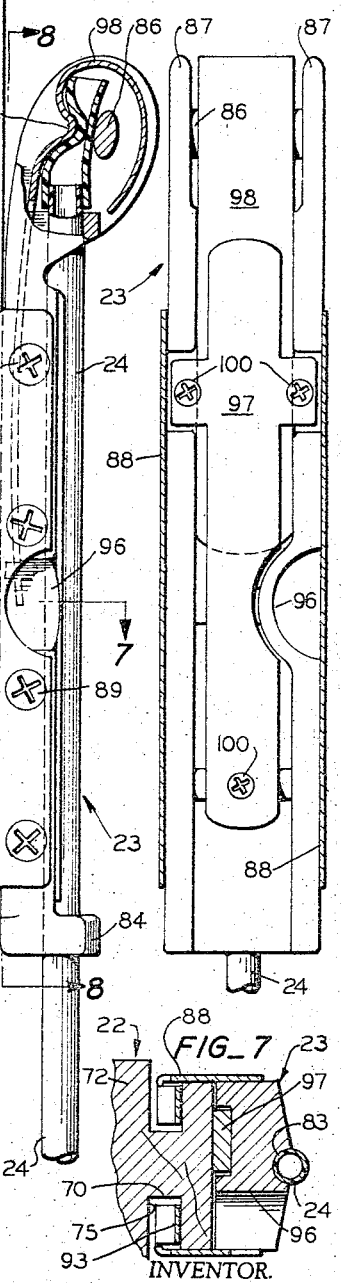

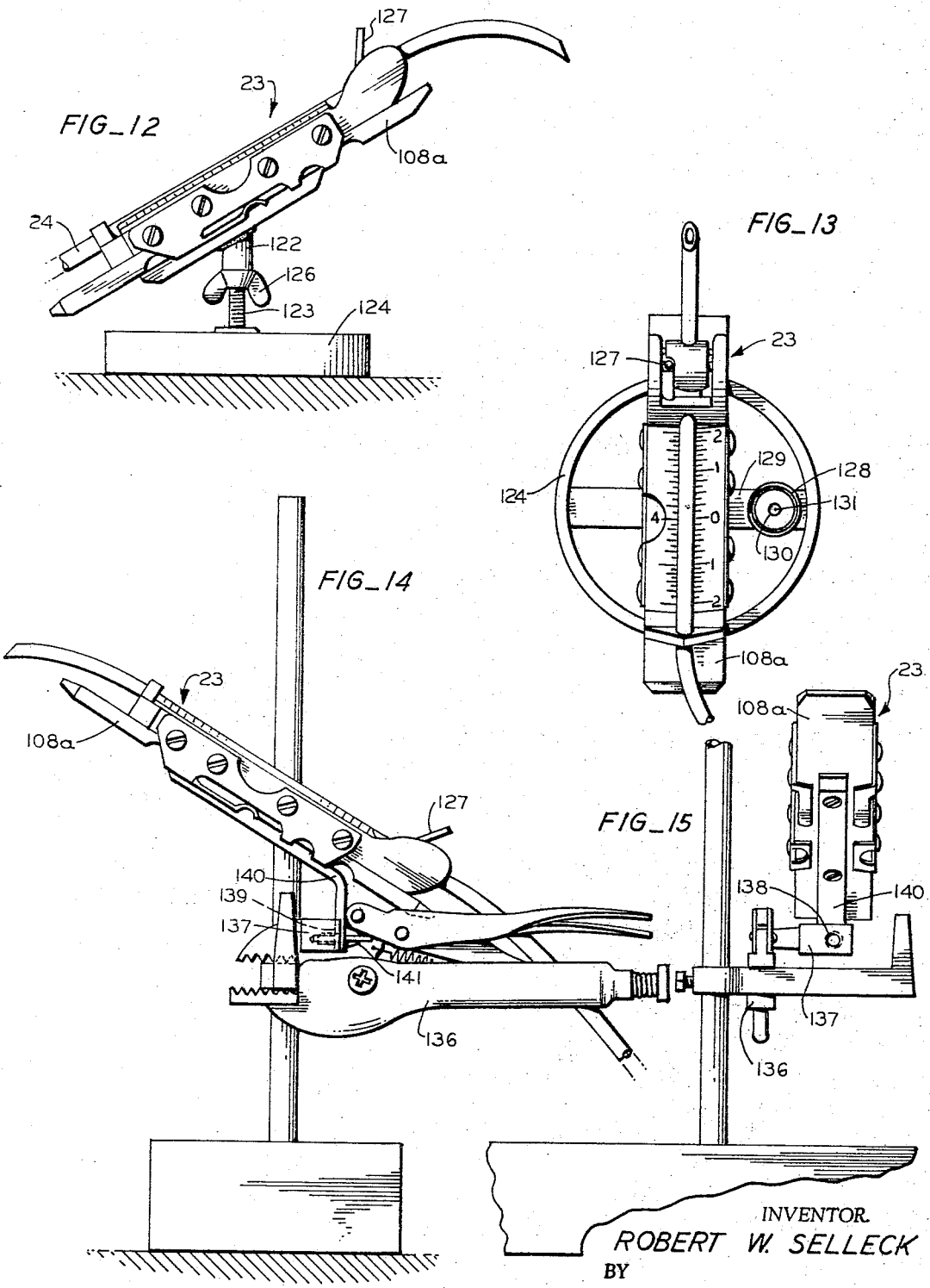

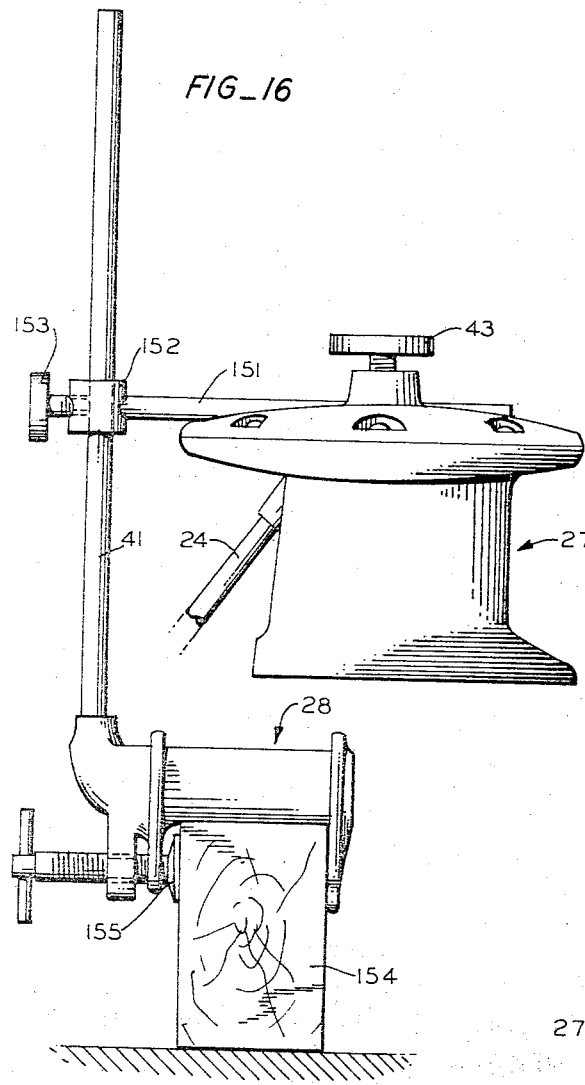
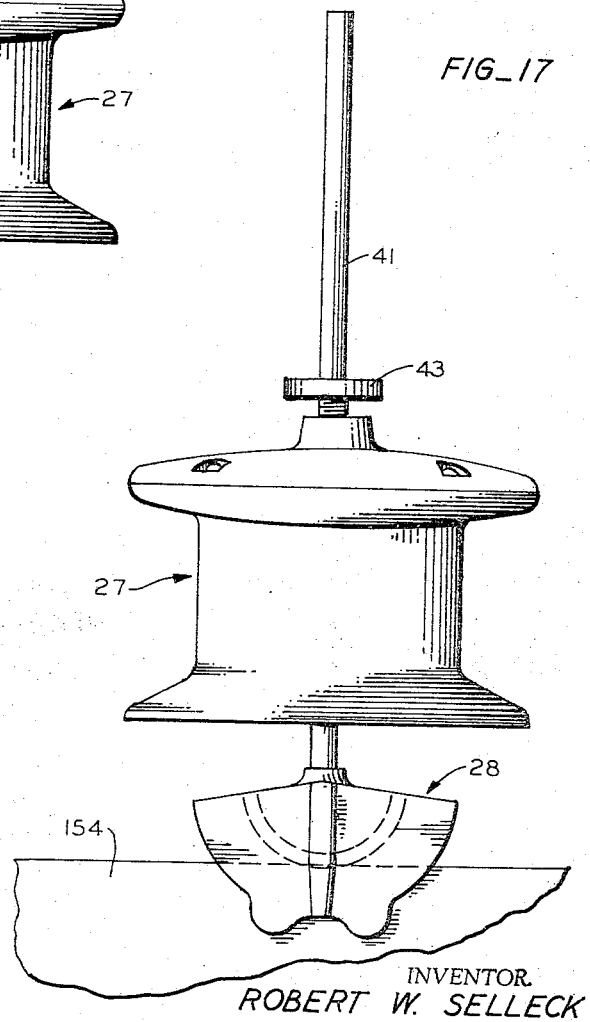

United States Patent Office 3,330,045
Patented July 11, 1967

3,330,045
ELEVATION MEASURING INSTRUMENT
Robert W. Selleck, 2952 Senter Road,
San Jose, Calif. 95111
Filed Oct. 21, 1963, Ser. No. 317,834
6 Claims. (Cl. 33—209)

The present invention relates to elevation measuring instruments of the liquid-level type and is concerned more particularly with an instrument of this character which is compact in its construction and which can be readily carried from place to place and is easy to operate in use.

The present application is in part a refile of my abandoned application Ser. No. 806,920, filed Apr. 16, 1959.

It is a general object of the invention to provide an improved elevation measuring instrument of the liquid-level type.

Another object of the invention is to provide an instrument of the above character in which the liquid reservoir element, and its mounting element, combine to make a hose storage means of collapsible character.

A further object of the invention is to provide an instrument of the above character in which the mounting means also incorporates means for placing the reservoir in a substantially horizontal position.

Still another object of the invention is to provide an instrument of the above character in which a removable scale element is provided for selective attachment to the measuring stick or to any one of a plurality of related mounting stations to facilitate use of the measuring instrument in connection with the various measurements to be made.

Still a further object of the invention is to provide accessories for the elevation measuring instrument which facilitates its use in the leveling of structures such as the foundations of buildings, in determining the correct gradient for sewer pipe and the like, and other related uses such as the laying of brick.

Other objects and advantages of the invention will be apparent from the following description of a preferred embodiment thereof, taken in conjunction with the accompanying drawings, in which:

FIG. 1 is a perspective view of the measuring instrument, installed in place and ready to use;

FIG. 2 is a perspective view of the reference element with the tubing in stored position;

FIG. 3 is a plan view of the reference element including the reservoir unit and its mounting unit;

FIG. 4 is a sectional elevational view taken in a plane indicated by the line 4—4 in FIG. 3;

FIG. 5 is a fragmentary front elevational view of the measuring stick with a movable scale element mounted thereon;

FIG. 6 is a side elevational view of the structure shown in FIG. 5;

FIG. 7 is a transverse sectional view taken on the line 7—7 in FIG. 6;

FIG. 8 is a longitudinal sectional view taken on the line 8—8 in FIG. 6;

FIGS. 9–11 illustrate a modified form of the invention in which a part of the storage mechanism (namely, the reservoir element) is used in conjunction with a special attachment for a form board, for example, in obtaining leveling thereof;

FIG. 9 is an elevational view;
FIG. 10 is a sectional elevation taken in a plane indicated by the line 10—10 in FIG. 9;
FIG. 11 is a sectional elevational view taken in a plane indicated by the line 11—11 in FIG. 9;
FIG. 12 is an elevational view illustrating a modified mounting of the removable scale element;
FIG. 13 is a plan view of FIG. 12;
FIG. 14 illustrates a further modified form of mounting for the removable scale element;
FIG. 15 is another modified mounting of the scale element illustrating its use in connection with the upright mounting post.
FIG. 16 shows the use of the hose carrying element of the instrument in connection with the desired mounting of the reservoir element on a horizontal board;
FIG. 17 is an elevational view taken from the right of FIG. 16.

Referring to FIGURE 1, the measuring instrument comprises a reference element indicated generally at 20 and an upright vertically disposed measuring element or stick 21 comprising a stick portion 22 and a scale element 23 slidably and removably mounted on the stick 22, this scale element being connected by a hose 24–26 to the reservoir unit 27 of the reference element 20. The hose section 24 is of smaller diameter than the hose section 26 as will be later described, and these hose elements serve to connect a source of liquid in the reservoir or reference element 27 with the measuring or scale element 23 to be used in reference to the stick 22 when used at different elevations.

The reference element 20 comprises a collapsible holder or reel for the hose when not in use, and also means for mounting the reference element in place and in level condition. The reservoir of the element 20 supplies a sufficient amount of liquid to allow for changes in elevation of the end of the hose within the limits of the scale element without disturbing the level of the liquid in the reservoir element as will be later described.

Referring to FIGURES 1 through 4, the mounting unit 28 comprises a casting having a semi-cylindrical center portion 31, and respective end flanges 32 and 33 forming a reel part which serves to retain the hose or flexible tubing wound on the semi-cylindrical portion 21 and also to grip a support, as will be later described. The flange 33 has a projecting boss 34 provided adjacent one end with a transverse threaded aperture to receive a clamping screw 36 having a clamping button 37 thereon, so that this mounting unit can be attached securely to suitable upright 38. The flange 33 also has a recessed apertured boss 35 which receives in fixed position a rod 41 which, at its opposite end, is slidably and rotatably engaged in suitable apertures in a central extension 42 of the top or cover 59 of the reference element 27. A clamping screw 43 is threaded in this extension 42 to engage and hold the rod 41 in adjusted position.

The reference element 27 (FIGURES 1 and 4) also comprises a body or casting 50 having a central semi-cylindrical body portion 51, from which at its ends respective semi-circular flange 52 and circular flange 53 extend to form side flanges of another reel part for storage of the hose on the portion 51 when it is wound about the reservoir element 27 and around the mounting unit 28 as shown in FIGURE 2. The flange 53 is part of a bottom wall 54 of the liquid reservoir which is formed in the reservoir element 27 by the wall 54 and a loose flexible diaphragm 56 of plastic or other suitable material. The diaphragm 56 is seated in a circular goove 57 being held therein by an O-ring 58 of rubber or other suitable resilient material clamped in place by the cover 59. Cover 59 in turn is held in place by the series of screw 61 (FIG. 3) extending therethrough and threaded into the circular flange 53.

The outlet from reservoir is formed by a hose fitting 61, upon which an adjacent end of the hose 26 is fastened. Centrally of the wall 54 there is provided a depressed portion 66 having an opening which receives a tubular valve stem 62, carrying a valve element 63 which is protected by a short length of rubber hose 64. The valve 62 is a conventional type of valve commonly used in bicycle tires. By inverting the reservoir element 27 from the position shown in FIGURE 4, and filling the reservoir with liquid to obtain a super atmospheric pressure therein, air trapped in the reservoir will seek the central depressed portion 66 of the wall 54 and the valve 62 can be opened and allow its escape.

Referring to FIGURES 5 and 6, the measuring element or stick 22 comprises a pair of telescopically engaged generally rectangular wooden sticks 71 and 72 having conventional U-shaped guides 73, one of which carries a clamping screw 74. Thus the sticks 71 and 72 can be extended or contracted with respect to each other and held in adjusted position. The stick 72 has respective opposite longitudinal side grooves 70 each having a pair of opposite walls 75, the front one of which has a series of evenly spaced recesses 76, corresponding to evenly spaced calibrations 77 on the front face of the stick, the calibrations as shown being spaced at intervals of 2" each reading in both directions from a central zero point. Two inverted series of calibrations are provided to enable reversing of the measuring stick when required.

The scale element 23 (FIGURES 5 and 6) comprises an elongated body or casting 81 on the front face of which a scale 82 is placed alongside a semi-cylindrical recess 83 for the hose 24. At the lower end of the scale element 81 an apertured ear 84 is provided to retain the hose 24, and its upper end is clamped between a cross member 86 extending between opposed extended flanges 87 of casting 81 and a spring valve member 98, later referred to. Respective similar but complementary angle-shaped latch members 88 are secured along either side of the body 81 by means of screws 89, and have respective inturned flanges 91 to slidably engage the recessed walls 75 of the grooves 70. One of the flanges 91 of each latch member 88 has an extended latch finger 92 terminating in a curved latch portion 93 for cooperation with the latching recesses 76 of the stick 72. As seen most clearly in FIGURE 5, the body 81 is recessed at 96 to permit viewing of the scale 77 on the stick 72.

Means are provided for opening the tube 24–26 to atmosphere during the measuring operation to allow the liquid in the tube to seek the level of the liquid in the reservoir and for this purpose the end of the tube 26 is clamped between the cross member 86 and a bent portion 94a of the spring valve member 98 as previously described. The member 98 (FIGURE 6) is curved to conform to the configuration of the flanges 87, and extends downwardly alongside the body 81 being held in place by a cross-shaped strip 97 (FIGURE 8) secured in place by suitable screws 100. In addition to holding the spring valve member 98 in place, the strip 99 also provides a surface for engagement with the adjacent surface of the measuring stick 22 upon which the scale element is mounted.

The spring valve member 98 normally engages the hose 24 and compresses it against the cross member 86 and thereby shuts off communication to the atmosphere so that the scale element can be handled as desired without losing liquid from the system in being stored or transported from place to place.

In operation, the reference element 28 is erected on a standard 38 as shown in FIGURE 1, and the stick 21 is placed on the same level, or at any desired starting elevation, and the valve spring member 98 is operated to open the tube 24 so that the level in the tube 24 can seek the level of the liquid in the reservoir of the reference element. The stick 21 and the scale element 23 may then be adjusted so that the level of liquid reads against the graduations on the scale element 23. This gives a starting reading on the stick. Thereafter, the stick 21 is moved to a location whose elevation is desired with respect to the starting place, and the valve spring member 98 is again operated to allow the liquid to seek the same level as the liquid in the reservoir, and the scale element 21 is adjusted along the stick 21 until the liquid level reads against the graduations on the scale element 23. The reading of the scale element 23 gives an indication of the difference in elevation. This operation is repeated for as many locations for which the elevation is required. The operator of the instrument simply is required to note the original reading, and thereafter to note the reading of the scale element 23 on the stick 22 at each location, with the notation as to whether the reading is positive or negative; i.e., higher or lower than the first setting and combine the two figures by simple addition or subtraction to obtain the actual difference in elevation.

Referring to FIGS. 9–11, there is illustrated a modified form of the elevation-measuring instrument wherein releasable locking-type plier means is employed to ensure the various elements in place on a desired structure. For example, the reference element 27 has secured therein an angle-shaped supporting for 101 by means of the clamping screw 43, and the upright portion of the bar 101 is received in a mounting block 102 having two apertures 103 at right angles to each other and forming mounting stations. The block 102 has a clamping screw 104 carried on a threaded aperture therein. The mounting block 102 is carried by one of the jaws of the pair of pliers 106 of the type disclosed in U.S. Patents Nos. 2,280,005 and 2,514,130. The pliers 106 are closed and locked on a mounting piece 107 of a suitable character. The aperture 103 in the mounting block 102 are at right angles to each other and respectively parallel to and perpendicular to the jaws 106 when in their closed position, so that if the jaws are clamped on a horizontal piece as shown, one of the holes 103 in the block 102 will be vertically upright and the other will be horizontal.

Correspondingly, the removable scale element 23 is slidably engaged with an inclined mounting plate or stick 108 carried by suitable bracket means formed integrally with one of the pair of clamping jaws 111 of the pair of pliers 112. These pliers are engaged with a board 113 as used in a form for concrete, so that the pliers can be engaged and removed from the board as they are moved along after the scale element 23 is initially leveled with respect to reference element 27 and its water level. Referring to FIG. 10, it will be noted that one of the jaws 111 of the pliers 112 has a surface 114 which is disposed at a right angle to the inner surfaces of the jaws and is adapted to abut the top of the board 113 so as to accurately position the pliers 112 and the scale element 23. This accurate positioning is important only with the pliers disposed in the vertical position, as shown in FIG. 10.

The inclined mounting of the removable scale element is highly desirable as it enables ready reading of the level of liquid in the tube 24 from a standing position above the level, and at the same time, the inclined position of the scale element 23 provides a magnification of the movement of the liquid as compared with the vertical position of the scale element as illustrated, for example, in FIGS. 5 and 6.

In using the equipment illustrated in FIGS. 9–11, the elements are set up side by side on a level top surface of a form as illustrated in FIG. 9, and the height of the reservoir element 27 is adjusted by loosening the screw 104 and raising or lowering the angle mounting bar 101 until the water level reads at the zero mark on the scale element 23. Then the reference element 27 is clamped in place, and the scale element 23, with its connected hose, can be moved along a form in steps and the desired leveling of the form be made as the scale element 23 is positioned at each location.

FIGS. 12 and 13 illustrate a modified form of the invention in which the removable scale element 23 carried by an inclined mounting element or stick 108a which has secured thereto a threaded sleeve 122 which is threadedly engaged with an upright screw portion 123 carried by a cylindrical base 124, a wing nut 126 serving to lock the scale element in place. The screw 123 and the nut 122 enable adjustment of the removable scale element 23 with reference to the reference element 27 so as to secure the desired zero reading. The removable scale element 23 has its tube-clamping member, or cam 86a, provided with an operating stick, or rod 127 (which can be used alternatively to the spring operating member 98) and the cam member 86 moved over center so as to remain in open position or in closed position.

If desired, the cylindrical base 124 can be provided with a level 128 on one of the cross pieces 129 so that the level condition of the base can be employed. A center circular index 130 is employed for alignment with the bubble 131. This mounting base 124 is used under conditions where a broad mounting surface is available, as, for example, in the setting or laying of brick.

Referring to FIGS. 14 and 15, a further modified mounting of the removable scale element is illustrated wherein the mounting pliers 136 are provided with a rectangular mounting block 137 which has two threaded holes 136 at right angles to each other, these threaded holes being perpendicular to respective mounting stations in the form of grooves 139, to receive the lower apertured end of a mounting plate 140 for the removable scale element 23. A screw 141 with a wing-nut handle is threaded into one of the apertures 138 to secure the plate 140 in place. The block 137 has a pair of these mounting grooves 139 in faces at right angles to each other so that the pliers can either be applied to a horizontal surface, or vertically disposed surface, and still provide the desired mounting of the removable scale element. In FIG. 14 the removable scale element 23 is reversed end for end in position so as to place the cutoff valve or cam 86 at the lower end so that the cut off of the liquid will always occur below the reading point on the scale element and will always be made where the tube contains liquid.

FIGS. 16 and 17 illustrate a further modified mounting of the reservoir element 27 wherein a special mounting bracket or shaft 151 is provided, having a sleeve 152 to receive the connecting rod 41 between the reference element 27 and the mounting unit 20 of the collapsible reel, this shaft 152 being secured in place by a clamping screw 153. The two flanges 32 and 33 of the collapsible reel may be secured to a suitable part of a building structure such as a 2 x 4 154 by means of the clamping screw and plate 155.

While I have shown and described certain preferred forms of the invention, it will be apparent that the invention is capable of variation and modification from the form shown so that the scope thereof should be limited only by the scope of the claims appended hereto.

Which I claim is:

1. In an elevation-measuring instrument of the liquid-level type, a liquid reservoir unit comprising a housing member, a flexible diaphragm mounted in said housing member to form therewith a reservoir cavity, said housing member having a central downwardly extending portion below the diaphragm, so that when inverted, said portion becomes the topmost portion of the reservoir cavity, and a valve mounted in said portion for escape of air bubbles from the reservoir.

2. In an elevation-measuring instrument of the liquid-level type, comprising a reference element, a measuring element, and flexible tubing extending therebetween; said reference element including a reservoir unit comprising opposed upper and lower members having substantially circular flange portions and means for securing these flange portions together, the flange portion of one of said members including a circular groove, a flexible diaphragm located between said members and extending into said groove, an O-ring securing said diaphragm in said groove and compressed therein by the other of said members, said lower member and said diaphragm forming a reservoir cavity, and said lower member having a central downwardly extending portion below the diaphragm so that when the reference element is inverted said portion becomes the topmost portion of the reservoir cavity, a valve mounted in said portion for escape of air bubbles from the reservoir, said valve extending downwardly below said portion, and said one member having a reel part in connection therewith extending in the same direction as said valve member to provide protection therefor, said reel part comprising means for storage of said tubing.

3. In an elevation-measuring instrument of the liquid-level type having a reference element, a measuring element, and flexible tubing extending therebetween; said measuring element comprising an elongated member having equally spaced depressions or notches therein to form graduations of height or distance, a scale element slidably engaging said member and having releasable latch means for seating in a depression to hold the scale element releasably in place, graduations extending along said scale element for the extent of the spacing of the depressions on said member, and said flexible tubing having a portion extending along the graduations of said scale element, whereby the movement of the measuring element to read a desired elevation may be contained within the length of the graduations on said scale element, 4. In an elevation-measuring instrument of the liquid-level type, a reference element comprising a liquid reservoir, said reference element having means to detachably receive a mounting or connecting rod, and also including a mounting unit having a rod normally received therein, said mounting unit having spaced apart flanges with clamping means therein for securing to a mounting member, and an intermediate fixture for connection between said reservoir unit and said mounting unit comprising a rod for reception in the rod receiving means of said reservoir unit and having a sleeve to engage over the rod of said mounting unit.

5. In an elevation-measuring instrument of the liquid-level type, a reference element, a measuring element, and flexible tubing extending therebetween; said reference element comprising a reservoir unit forming a source of liquid and a mounting unit, means connecting said units for relative movement whereby the distance between the units can be varied, said connecting means also including means providing a substantially universal relative adjustment between said units to enable an approximately level location of the reservoir unit, both said reservoir unit and said mounting unit have a hub part formed as a part of a cylinder and at either end of said hub part tubing retaining flanges whereby said units comprise reel parts for winding of the tubing about said parts for storage, relative movement of said units enabling immediate release of all the convolutions of the tubing therefrom, or tightening of the tubing as wound about said units.

6. In an elevation-measuring instrument of the liquid-level type, a reference element, a measuring element, and flexible tubing extending therebetween; said reference element comprises a reservoir unit forming a source of liquid, a scale element forming a part of said measuring element, and having graduations thereon, a portion of said tubing extending along said scale element and means mounting said scale element in position inclined from the vertical so that the liquid level in the tubing can be read from above the scale element, said mounting means comprising a clamping means selectively engageable with a support in either a vertical or a horizontal position, and said clamping means having a plurality of fastening means by selective connection to said scale element to accommodate the vertical and horizontal positioning of said clamping means.

References Cited

UNITED STATES PATENTS

| | | | |
|---|---|---|---|
| 397,294 | 2/1889 | Karr | 33—209 |
| 872,183 | 11/1907 | Jenning | 33—209 |
| 2,510,181 | 6/1950 | Jury | 248—226.3 X |
| 2,558,004 | 6/1951 | Schmidt | 33—209 |
| 2,588,131 | 3/1952 | Lester | 33—170 |
| 2,617,199 | 11/1952 | Samotey | 33—170 |
| 2,789,364 | 4/1957 | Selleck | 33—209 |
| 2,814,127 | 11/1957 | Blatchford | 33—209 |
| 3,111,296 | 11/1963 | Ludes | 248—226.3 X |
| 3,117,381 | 1/1964 | Durkin | 33—209 |

FOREIGN PATENTS

| | | |
|---|---|---|
| 471,983 | 9/1937 | Great Britain. |
| 520,451 | 3/1955 | Italy. |

LEONARD FORMAN, *Primary Examiner.*

W. D. MARTIN, *Assistant Examiner.*